United States Patent [19]

Vincent

[11] Patent Number: 4,762,116
[45] Date of Patent: Aug. 9, 1988

[54] SOLAR WATER HEATERS ESPECIALLY INTENDED FOR USE WITH SWIMMING POOLS

[75] Inventor: Colin C. Vincent, Alinjarra, Australia

[73] Assignee: S. W. Hart & Co. Pty. Ltd., Welshpool, Australia

[21] Appl. No.: 769,637

[22] Filed: Aug. 26, 1985

[51] Int. Cl.⁴ .............................. F24J 2/24; F24J 2/36
[52] U.S. Cl. ................................... 126/448; 126/426; 126/447; 165/171; 165/173
[58] Field of Search ................ 165/171, 173; 126/415, 126/416, 417, 426, 448, 450

[56] References Cited

U.S. PATENT DOCUMENTS

| | | | |
|---|---|---|---|
| 3,893,507 | 7/1975 | MacCracher et al. | 126/448 |
| 3,937,208 | 2/1976 | Katz et al. | 126/448 |
| 4,098,331 | 7/1978 | Ford et al. | 165/771 |
| 4,178,910 | 12/1979 | Grammer et al. | 126/417 |
| 4,256,087 | 3/1981 | Sowers | 126/415 |
| 4,290,413 | 9/1981 | Goodman | 126/417 |
| 4,296,804 | 10/1981 | Pess et al. | 165/173 |
| 4,312,323 | 1/1982 | Domenech | 126/426 |
| 4,321,911 | 3/1982 | Offutt | 126/448 |
| 4,391,046 | 7/1983 | Pietraschke | 126/448 |
| 4,418,746 | 12/1983 | Langenhorst et al. | 126/448 |
| 4,426,998 | 1/1984 | DuBosque, Jr. | 126/448 |
| 4,625,794 | 12/1986 | Duist | 126/448 |

FOREIGN PATENT DOCUMENTS

| | | | |
|---|---|---|---|
| 3121633 | 12/1982 | Fed. Rep. of Germany | 126/445 |
| 2099984 | 12/1982 | United Kingdom | 126/416 |

Primary Examiner—Albert W. Davis, Jr.
Attorney, Agent, or Firm—Pollock, Vande Sande & Priddy

[57] ABSTRACT

A solar water heater especially intended for use with swimming pools, and comprising an inlet header, an outlet header, a strip of flexible material comprising a plurality of longitudinally extending tubes. Each end of the strip is connected to a respective manifold comprising a first side provided with a respective spigot for each tube in the strip, and a second side provided with less apertures than the number of spigots, such that, in use, the tubes at each end of the strip are connected to the spigots of the manifold and the apertures of the manifold are connected to a header, whereby fluid communication is established between the headers and the web.

7 Claims, 4 Drawing Sheets

SOLAR WATER HEATERS ESPECIALLY INTENDED FOR USE WITH SWIMMING POOLS

FIELD OF THE INVENTION

The present invention relates to solar water heaters.

BACKGROUND OF THE INVENTION

It is known to use solar water heaters to heat swimming pool water. One such type of swimming pool heater comprises resilient strips formed of rubber or plastic material and comprising a plurality of longitudinally extending tubes. The strips are connected to inlet and outlet headers. The strips are cut into lengths having ends. Typically, at the ends of the strips each tube is connected into an inlet or an outlet header. The headers and tubes are so arranged that water from the swimming pool is pumped into and flows along the inlet manifold, passes into the tubes of the strips, flows through these tubes and then passes into the outlet manifold from where it returns to the swimming pool. During periods when solar radiation impinges on the strips, the water passing through the tubes is heated. These swimming pool heaters typically comprise a plurality of the strips which are usually mounted on a sloping roof.

The headers may be mounted in juxtapositioned relationship close to the lower end of the sloping roof, or one header may be located close to the lower end of the roof and the other header located close to the upper end of the roof. Also, both headers could be located at either or each end of the roof with horizontally disposed tubes. In prior art solar swimming pool heaters of the type described above, the tubes of the strips have typically been mounted in respective, individual apertures in the headers. However, this construction requires the use of a substantial amount of on site labor when assembling the heater which increases costs.

SUMMARY OF THE INVENTION

The present invention provides a solar swimming pool heater of the type described above in which the connection of the tubes to the headers is modified so as to reduce the amount of on site labor required.

In accordance with one aspect of the present invention, there is provided a solar water heater especially intended for use with swimming pools, said solar water heater comprising an inlet header, an outlet header, a strip of flexible material comprising a plurality of longitudinally extending tubes, said strip having a first end and a second end, wherein each end of the strip is connected to a respective manifold comprising a first side provided with a respective spigot for each tube in the strip, and a second side provided with an aperture means with less apertures than the number of spigots, such that, in use, the tubes at each end of the strip are connected to the spigots of the manifold and the aperture means of the manifold is connected to a header whereby fluid communication is established between the headers and the web.

BRIEF DESCRIPTION OF THE DRAWINGS

The invention will now be described, by way of example, with reference to the accompanying drawings, in which.

DESCRIPTION OF PREFERRED EMBODIMENT

Figure 1:
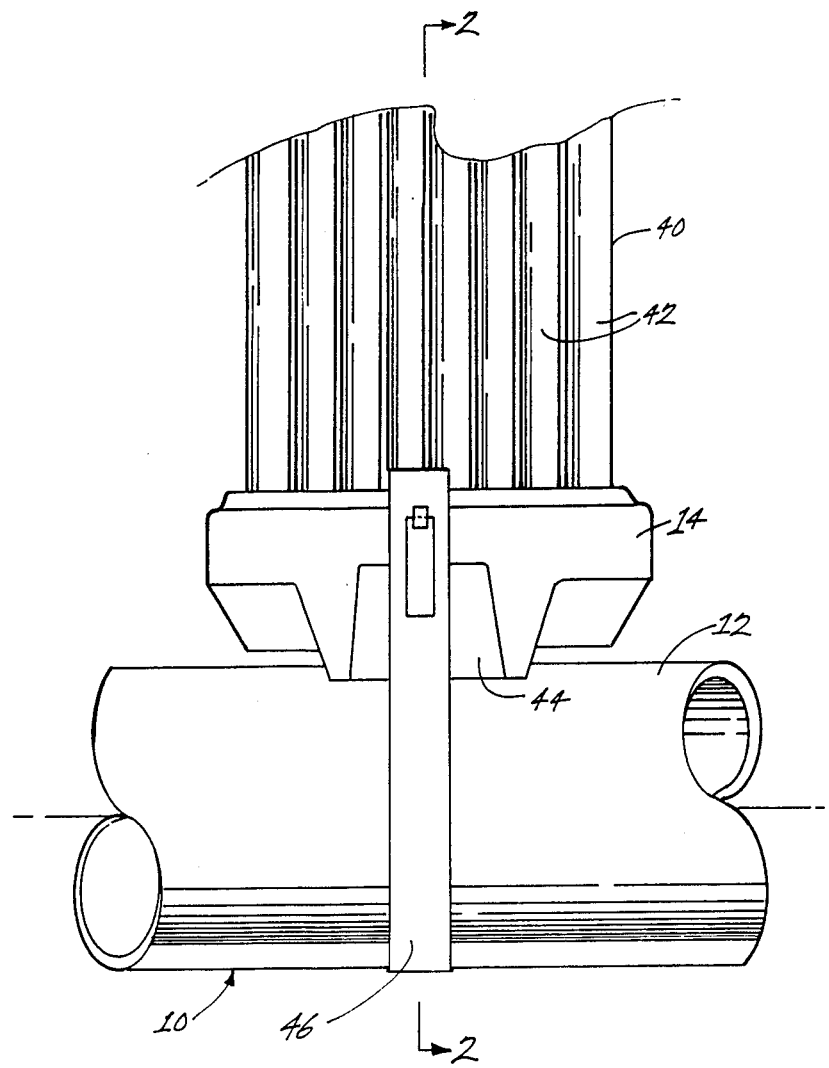
FIG. 1 is a side elevation of a portion of a solar water heater in accordance with the present invention.
Figure 2:
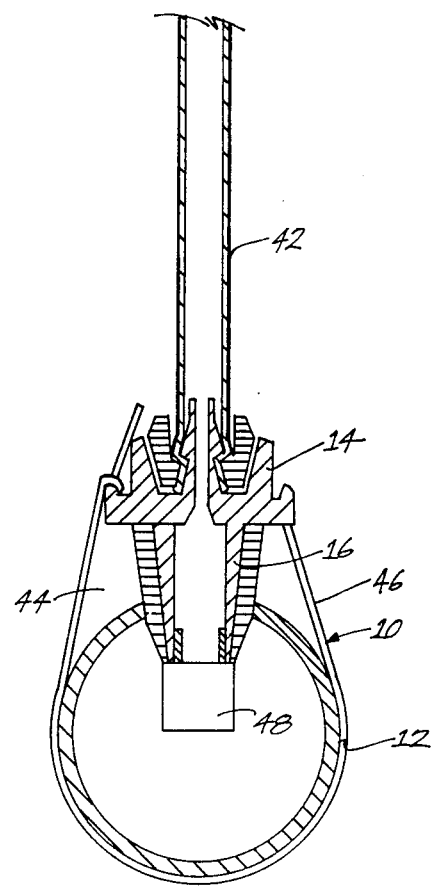
FIG. 2 is a sectional view along the line 2—2 of FIG. 1.

FIGS. 1 and 2 show a portion of a solar water heater 10 in accordance with the present invention. The solar water heater comprises a pair of headers 12 (only one of which is shown). Each header 12 is formed with a plurality of spaced apertures. Each aperture in the header is arranged to be connected to a manifold 14.

Figure 4:
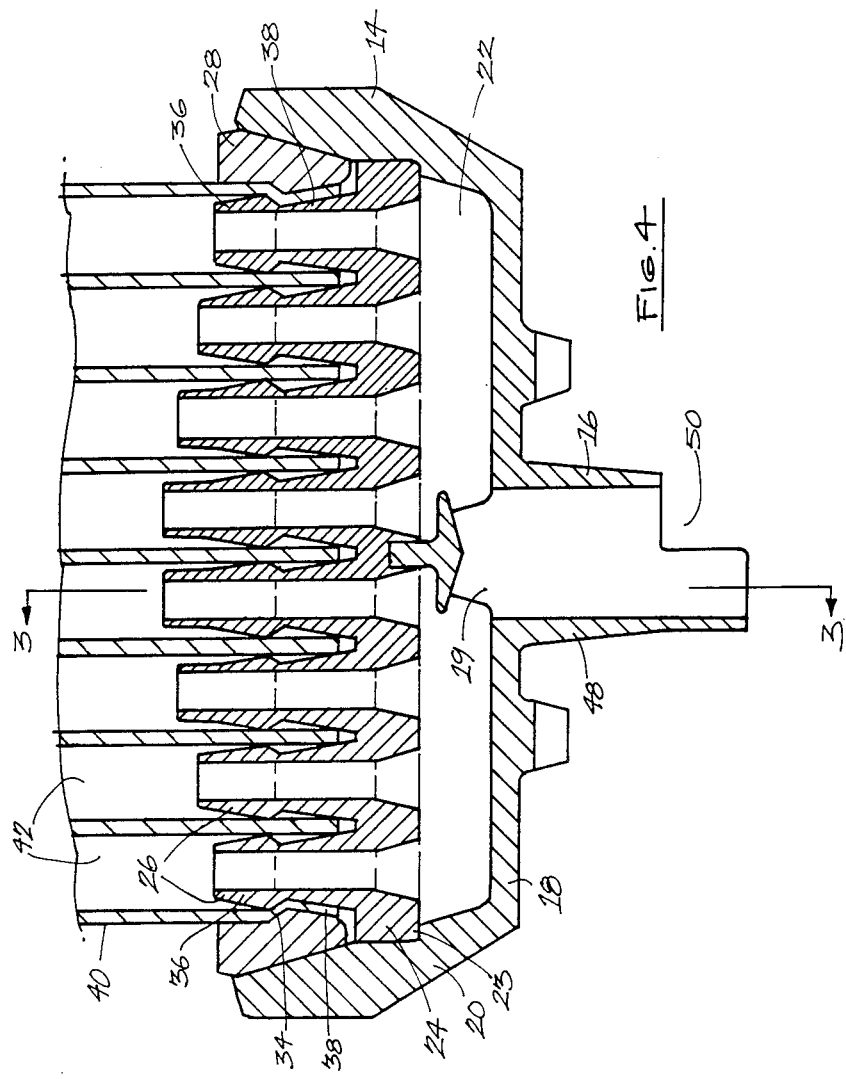
FIG. 4 is a sectional view along the line 4—4 of FIG. 3.
Figure 3:
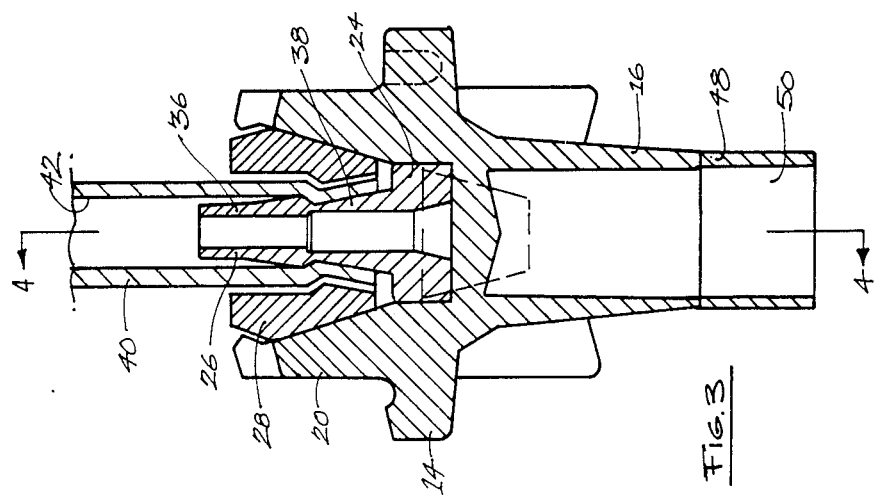
FIG. 3 is a sectional view similar to FIG. 2 taken along the line 3—3 of FIG. 4 and showing a manifold and locking collar of the assembly of FIGS. 1 and 2 prior to connection to a header.

As can be seen in FIGS. 3 and 4, each manifold 14 has a side with a singular annular projection 16 extending therefrom. Further, the manifold 14 has an elongated base 18 provided with an aperture 19 about which the projection 16 is formed. An upstanding wall 20 extends around the periphery of the base 18 to form a recess 22. The wall 20 is formed along its length with a shoulder 23 at an intermediate height. A spigot assembly 24 formed in one piece is mounted on the shoulder 23 of the wall 20. The spigot assembly 24 comprises a number of spigots 26. The inner face of the wall 20 above the shoulder 23 is tapered outwardly away from the shoulder 23.

Figure 5:
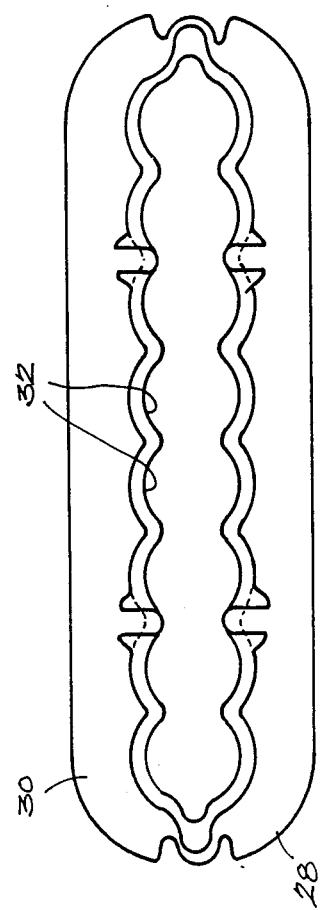
FIG. 5 is a plan view of a locking collar of the assembly of FIGS. 1 and 2.
Figure 6:
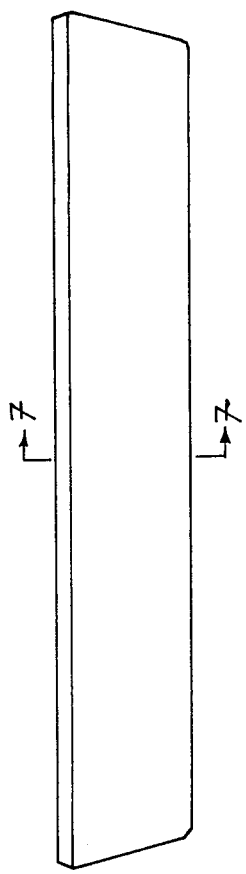
FIG. 6 is a side elevation of the locking collar of FIG. 5.
Figure 7:
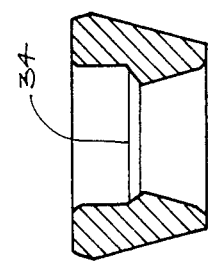
FIG. 7 is a sectional view along the line 7—7 of FIG. 6.

Further, the spigot assembly 24 is retained in place by means of a locking collar 28 which is best shown in FIGS. 5 to 7. As can be seen in these Figures, the locking collar 28 comprises a peripheral wall 30 which has an inner face formed with recesses 32 shaped to conform with the outer shape of the spigots 26. As can be seen in FIG. 6, the outer face of the peripheral wall 30 is tapered downwardly so as to fit snugly into the upper part of the recess formed by the wall 20, above the shoulder 23 thereof.

Further, as shown in FIG. 7, the recesses 32 are formed with a shoulder 34 at an intermediate height. This shoulder 34 conforms with the outer profile of the spigots 26 which have an outer circumferential projection 36 adjacent their upper ends and an outwardly flared outer portion 38 below the projection 36.

Turning back to FIGS. 1 and 2, it can be seen that the manifold 14 is connected to a strip 40 comprising a plurality of longitudinally extending tubes 42. As can be seen in FIGS. 3 and 4, each tube 42 has an end fitted around a respective spigot 26.

Further, as shown in FIG. 2, the projection 16 is inserted into one of the apertures in the header 12. Still further, a seal is effected by a resilient collar 44 which fits snugly around the projection 16 and into the aperture in header 12. The collar 44 is compressed between the header 12 and the projection 16 so as to be in sealing engagement therewith.

Further, the header 12 and manifold 14 are clipped together by means of a strap 46. The strap 46 has a slotted portion which fits around a corresponding projection in the header 12 and a free end arranged to engage with a corresponding projection in the other sie of the manifold 14.

Also, the projection 16 is complete with a scoop 48. As shown in FIG. 4, the scoop 48 contains a lateral aperture 50. This enables the manifold 14 to be specifically located such that the aperture 50 is facing upstream when in the inlet header and downstream in the outlet header. Thus, in the former case the scoop 48 enhances collection of water from the inlet header while in the latter case it enhances feeding of the water into the outlet header.

The strip 40 is typically formed of a resilient plastic or rubber material and may be black. Further, as shown, it may be formed of a series of contiguous tubes 42 with only a single wall thickness separating them.

The use of contiguous tubes 42 does away with the use of intervening webs of material.

The use of single wall thickness between the tubes 42 enhances heat collection since the resilient material has a low thermal conductivity and additional wall thickness is detrimental to heat conduction. Also, any solar energy falling on the strip 40 is available for collection whereas solar energy falling on intervening webs is wasted.

The manifold 14 and associated parts may be made of relatively rigid plastic material.

In use, a header 12 is formed with spaced apertures such as by drilling. Then a projection 16 of a manifold 14 is inserted into each aperture together with an associated sealing collar 44 so that a watertight seal is formed between the header 12 and the manifold 14. Further, the projection 16 complete with a scoop 48 is inserted into the header 12. Prior to this a spigot assembly 24 is placed into the recess formed by the wall 20.

The wall 20 and spigot assembly 24 may be connected together by solvent welding when they are formed of plastic material. This operation is normally performed during manufacture of the manifold 14. Then a strip 40 with a collar 28 mounted about it is mounted to the manifold 14 by pushing a respective tube 42 into each spigot 26. The tube 42 ends are retained in place on the spigots 26 by the collar 28 which is pushed over the projections 36 so that the shoulder 34 is closer to the base than the projections 36.

Further, the manifold 14 is secured to the header 12 by means of the strap 46. The amount of on site labor required to assemble the solar water heater of the present invention is relatively small compared to prior art solar water heaters of the same type. The header 12 shown may be an inlet header or an outlet header. The strip 40 extends to a manifold 14 which is mounted to a header 12 of the opposite type. The strip 40 is mounted on a roof and water is pumped up to the inlet manifold 12. The water passes through a plurality of the strips 40 and is heated by solar radiation impinging thereon. The water then passes into an outlet header for return to the pool. The manifold 14 may have more than one annular projection 16, provided that it has fewer annular projections 16 than the number of spigots 26. However, the use of a single projection 16 is preferred.

I claim:

1. A solar water heater especially intended for use with swimming pools, said solar water heater comprising an inlet header, an outlet header, a strip of flexible material having first end and a second end, a plurality of tubes formed in the strip and extending from the first end to the second end of the strip, wherein each end of the strip is connected to a manifold comprising a first side provided with a respective spigot for each tube in the strip, and a second side provided with an aperture means with less apertures than the number of said spigots, each manifold comprising a base and an upstanding wall extending around the base to form a recess, the spigots being mounted in the recess, the spigots being formed into a unitary spigot assembly and a single locking collar comprising an outer peripheral wall arranged to fit snugly in the recess and the outer peripheral wall having an inner face formed with recesses and shaped to conform with the outer shape of the spigot assembly and in which each spigot has a circumferential projection and the inner face of the locking collar has shoulder means arranged to engage with the projections on the spigots, such that, in use, the tubes at each end of the strip are connected to the spigots of one of the manifolds, each locking collar is located in the recess of one of the manifolds and the aperture means is connected to a header whereby fluid communication is established between the headers and the strip.

2. A solar water heater according to claim 1, in which the second side of the manifold comprises a single aperture means.

3. A solar water heater according to claim 1, in which the aperture means on the second side of the manifold is in the form of at least one annular projection, each projection being mounted in an aperture in the header.

4. A solar water heater according to claim 3, in which, in use, a seal is effected between each annular projection and the header by means of a respective resilient collar which is compressed between the projection and the header.

5. A solar water heater according to claim 1, in which the upstanding wall has an internal shoulder at an intermediate height above the base and the spigot assembly is mounted on the shoulder.

6. A solar water heater according to claim 1, in which the strip is formed of contiguous tubes with only a single wall thickness between neighbouring tubes.

7. A solar water heater according to claim 1, which is arranged to be clipped to the header by a clip means extending around the header and engaging with the manifold.

* * * * *